June 17, 1958     H. F. SMITH     2,838,764
WATER CLOSET TANK AND BOWL COMBINATION
Filed March 1, 1956

INVENTOR.
HARRY F. SMITH.
BY
RICHEY, WATTS, EDGERTON & McNENNY
ATTORNEYS

United States Patent Office 2,838,764
Patented June 17, 1958

2,838,764

WATER CLOSET TANK AND BOWL COMBINATION

Harry F. Smith, Lexington, Ohio, assignor to Mansfield Sanitary Pottery, Inc., Perrysville, Ohio, a corporation of Ohio Application March 1, 1956, Serial No. 568,888

2 Claims. (Cl. 4—12)

This invention relates to tank and bowl combinations for water closets and is particularly concerned with a new flush valve and gasket for use with such combinations.

The present invention resembles the flush valves of my Patents Nos. 2,590,471 and 2,700,774 but differs therefrom in structure, operation and results.

In the flush valve and gasket combination of my prior patents, the flush valve included a spud having an exteriorly threaded shank to receive a nut which was pressed against the lower surface of the bottom wall of the tank and created a sealing contact of a gasket against a flange on the spud within the tank and the inner surface of the bottom wall of the tank around the spud receiving opening. The space between the lower surface of the bottom wall of the tank and the opposed surface of the bowl around its spud receiving opening was sealed by another gasket which was pressed against those surfaces by the bolts used to secure the tank in place on the bowl. If desired the lower gasket could be attached to the threaded nut.

This valve and gasket combination was assembled with the tank and bowl at the factory. The upper gasket was placed on the shank of the spud, then the spud was positioned in the opening in the bottom wall of the tank, and the nut was screwed up on the lower end of the shank of the spud until it engaged the bottom surface of the tank and brought the upper gasket into sealing contact with the flange of the spud and inner wall of the tank. When the plumber installed the combination he first anchored the bowl to the floor. Then the lower gasket, if separate from the threaded nut, would be placed around the spud and thereafter the tank would be placed on the bowl with the spud extending into the spud receiving hole of the bowl. When the tank was drawn toward the bowl by the securing nuts and bolts, the lower gasket would be pressed into fluid sealing engagement with the bottom surface of the tank and the upper surface of the bowl around the spud receiving opening.

The present invention provides a flush valve and gasket combination which is composed of fewer, simpler and less expensive parts and which may be more quickly and easily secured to the tank.

Figure 1:
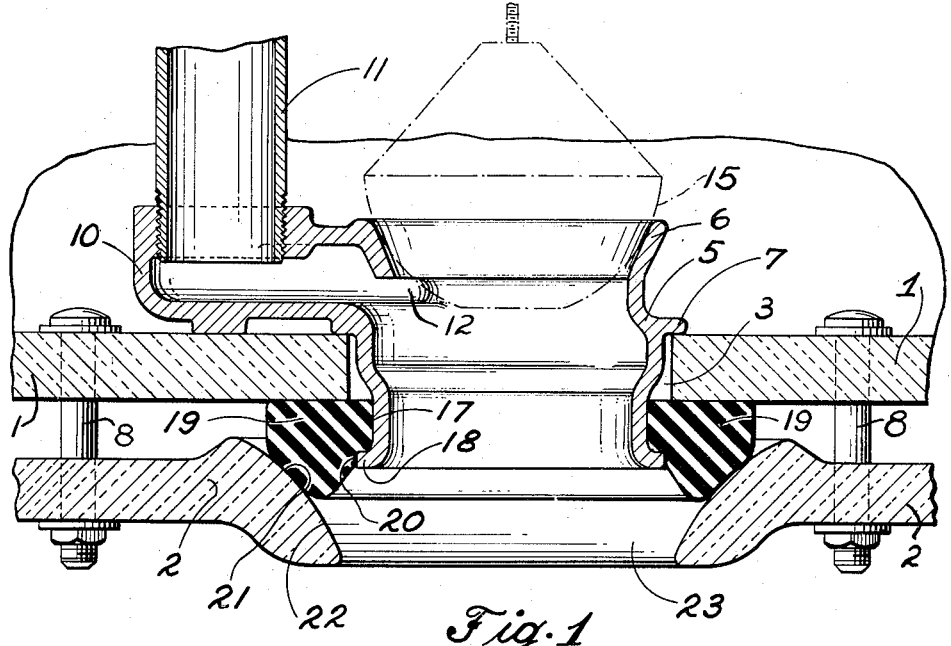
Figure 2:
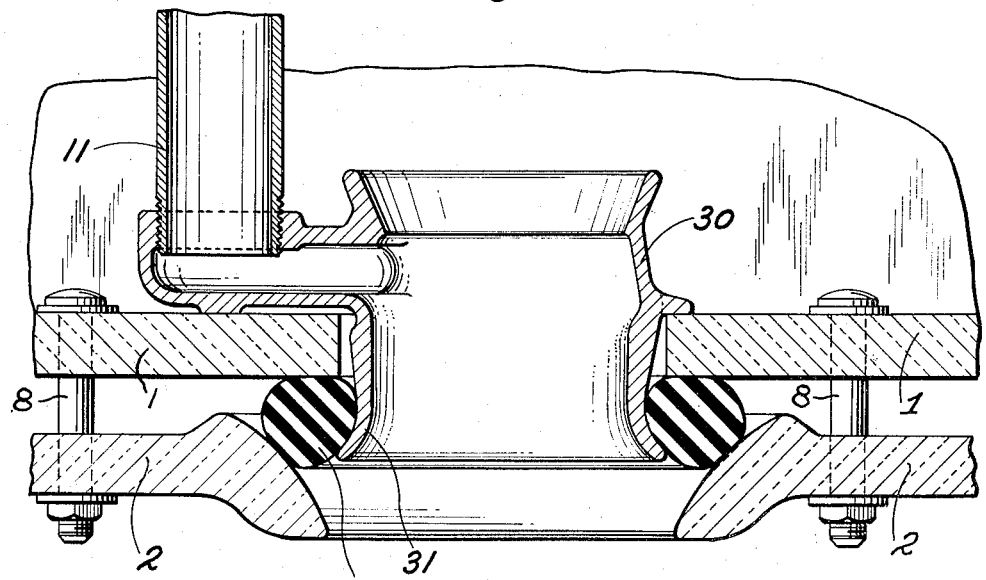

The present invention will be better understood by those skilled in the art from the following specification considered in connection with the drawings which accompany it and in which:

Fig. 1 is a vertical, sectional, fragmentary view taken through a tank and bowl combination equipped with a preferred form of flush valve and gasket combination; and Fig. 2 is a view similar to Fig. 1 but showing a modified form of valve and gasket combination, embodying the present invention.

Fig. 1 shows, fragmentarily, the bottom wall 1 of a water closet tank and the top wall 2 of a bowl for such a tank. The bottom wall 1 is provided with a flush valve receiving opening 3 which is disposed above the valve receiving opening 4 of the bowl. It will be understood that the tank and bowl of Fig. 1 are held in assembled position in any suitable manner, for example, as by means of the bolts 26, nuts 32 and clip 33 as shown in my Patent No. 2,590,471; that is, by bolts 8 which extend through the bottom wall 1 of the tank and through a flange of the bowl 2. Since the present invention does not reside in these securing means they have not been illustrated herein.

The flush valve of the present invention, as shown in Fig. 1, is preferably a metal casting and consists of a cylindrical body 5 having a conical upper end 6 in which a conventional ball valve 15 may seat to retain water in the tank. Below its conical upper end, the body 5 has an outwardly extending flange 7 to engage the inner surface of the bottom wall of the tank around the opening 3.

A hollow lateral extension 10 from the flush valve within the tank is open in its upper side to receive an overflow pipe 11 and opens, as at 12, into the interior of the flush valve.

The shank portion of the flush valve extends through the hole 3 in the bottom wall 1 of the tank, is of smaller diameter than that hole, and is provided with an outwardly extending flange 18 near its lower end. A resilient gasket ring 19 is disposed around the shank 17 between the upper surface of flange 18 and the lower surface of tank bottom 1. Preferably this gasket 19 has a notch 20 at its lower inner corner to receive the outwardly extending flange 18. The lower and outwardly facing surface 21 of the gasket ring 19 is preferably conically shaped to engage with a correspondingly sloped surface 22 on the bowl wall 2 around the opening 23 therethrough.

The gasket 19 is preferably made of elastomeric material, such as compounded natural rubber or synthetic rubber, and has sufficient stretchability so that it may be stretched over flange 18 of shank 17. This radial stretching results in axial thinning of the gasket which permits the placing of the gasket between the flange 18 and the lower surface of wall 1 of the tank. When the stretching stress is released the gasket tends to return to its original size and shape with the result that it decreases in diameter and increases in axial length and thereby forms a fluid tight seal between the lower surface of tank bottom 1 and the upper surface of flange 18, thus effectively sealing the tank against escape of water around the flush valve. When the bolts and nuts are tightened to urge the tank toward the bowl, the inclined surface 21 of the gasket will make fluid tight sealing contact with surface 22 of the bowl and thereby prevent escape of fluid between these two elements.

The flush valve illustrated in Fig. 2 is quite like the one shown in Fig. 1 and described above. In Fig. 2 the flush valve 30 is generally like valve 5 of Fig. 1 but is provided near its lower end with an outwardly curving flange-like projection 31 and the gasket which is initially round in cross-section and bears against the outwardly curving surface of projection 31, against the lower surface of bottom wall 1 of the tank, and against the generally conical surface 22 of the bowl.

The apparatus of Fig. 2 operates in substantially the same manner as has been described above in connection with Fig. 1 but the flush valve may not be held as securely in place by the gasket 32 as is the case with the apparatus of Fig. 1. However, the fluid sealing action is satisfactory with the device of Fig. 2.

It will be understood that the gasket and flush valve combination of Fig. 1 of this invention may be assembled with a tank at the factory and that when the tank reaches the place of installation the plumber merely has to place the tank on the bowl and insert the bolts and tighten the nuts to hold the tank and bowl in assembled position. During shipment even with the overflow pipe 11 in place in the flush valve the valve and gasket assembly will strongly resist dislodgment. Thus the present invention not only makes factory assembly of the flush valve and gasket possible and avoids all ordinary dangers of dislodging these parts in transit, but also reduces the cost of the device by using fewer and less expensive parts than were present in prior devices.

Having thus described this invention in such full, clear, concise and exact terms as to enable any person skilled in the art to which it pertains to make and use the same, and having set forth the best mode contemplated of carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A water closet tank and bowl combination comprising a tank having an outlet opening in its bottom wall, a flush valve engaging the inner surface of said wall and having a valve seat at its upper end, a lateral overflow inlet therebelow and a rigid unthreaded shank extending through the outlet opening and having an out-turned lower end, an elastomeric gasket around the shank and compressed between the out-turned end of the shank and the outer surface of the bottom wall of the tank, a bowl having an opening in its upper wall to receive said shank and to engage said gasket, and means urging said tank and bowl toward one another and securing them together, said gasket being sufficiently stretchable to be stretched and passed over the out-turned end of the shank and to resist dislodgment during shipment and being of sufficient thickness to form a fluid-tight seal between the outer surface of the bottom wall of the tank, said out-turned end of the shank and the gasket engaging surface of the bowl when the tank is secured to the bowl.

2. A water closet having an outlet opening in its bottom wall, a flush valve engaging the inner surface of said wall and having a valve seat at its upper end, a lateral overflow inlet therebelow and a rigid unthreaded shank extending through the outlet opening and having an out-turned lower end, and an elastomeric gasket around the shank and compressed between the out-turned end of the shank and the bottom wall of the tank, said gasket being sufficiently stretchable to be stretched and passed over the out-turned end of the shank and to resist dislodgment during shipment and being of sufficient thickness to form a fluid-tight seal between the outer surface of the bottom wall of the tank and said out-turned end of the shank when assembled therewith.

References Cited in the file of this patent

UNITED STATES PATENTS

| | | |
|---|---|---|
| 1,944,850 | Simpson | Jan. 23, 1934 |
| 2,700,774 | Smith | Feb. 1, 1955 |
| 2,721,332 | Smith | Oct. 25, 1955 |

UNITED STATES PATENT OFFICE
CERTIFICATE OF CORRECTION

Patent No. 2,838,764                                    June 17, 1958

Harry F. Smith

It is hereby certified that error appears in the printed specification of the above numbered patent requiring correction and that the said Letters Patent should read as corrected below.

Column 4, line 13, after "closet" insert -- tank --.

Signed and sealed this 26th day of August 1958.

(SEAL)

Attest:

KARL H. AXLINE  
Attesting Officer

ROBERT C. WATSON  
Commissioner of Patents